July 3, 1934.  H. FISCHER  1,965,459
BRAKE PEDAL RETAINING DEVICE
Filed Feb. 7, 1930   3 Sheets-Sheet 3
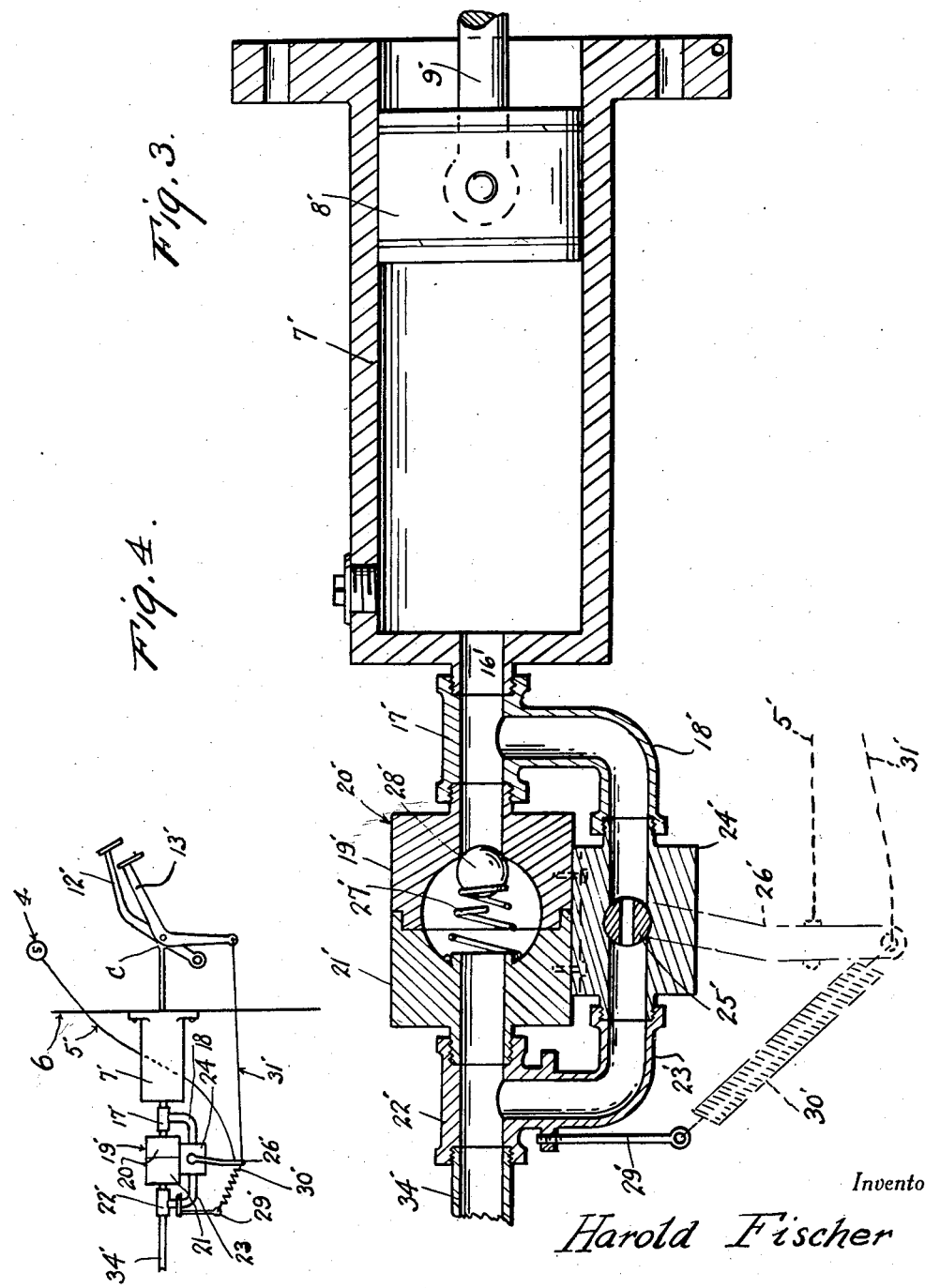
Inventor
Harold Fischer
By Clarence A. O'Brien
Attorney Patented July 3, 1934

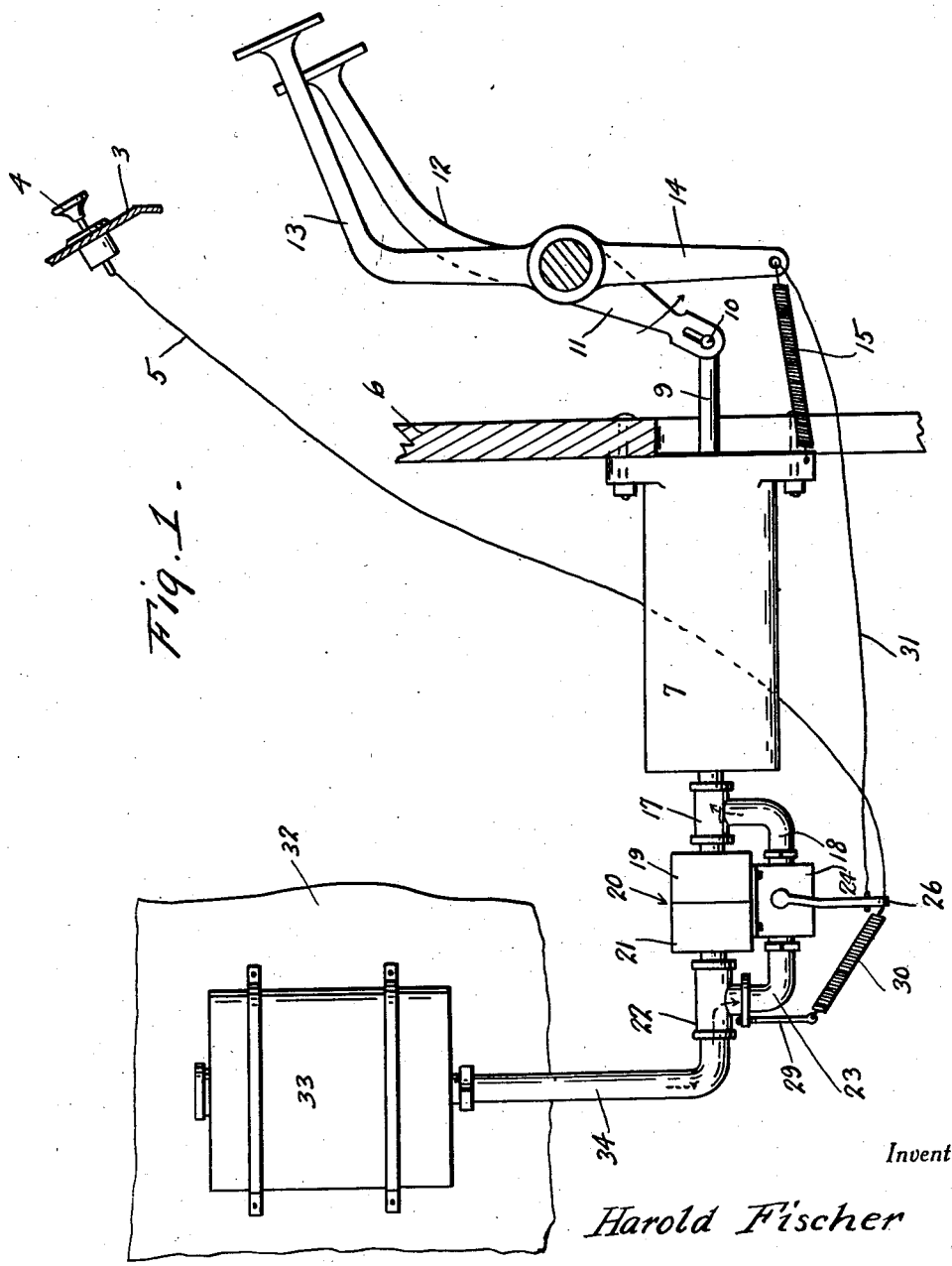

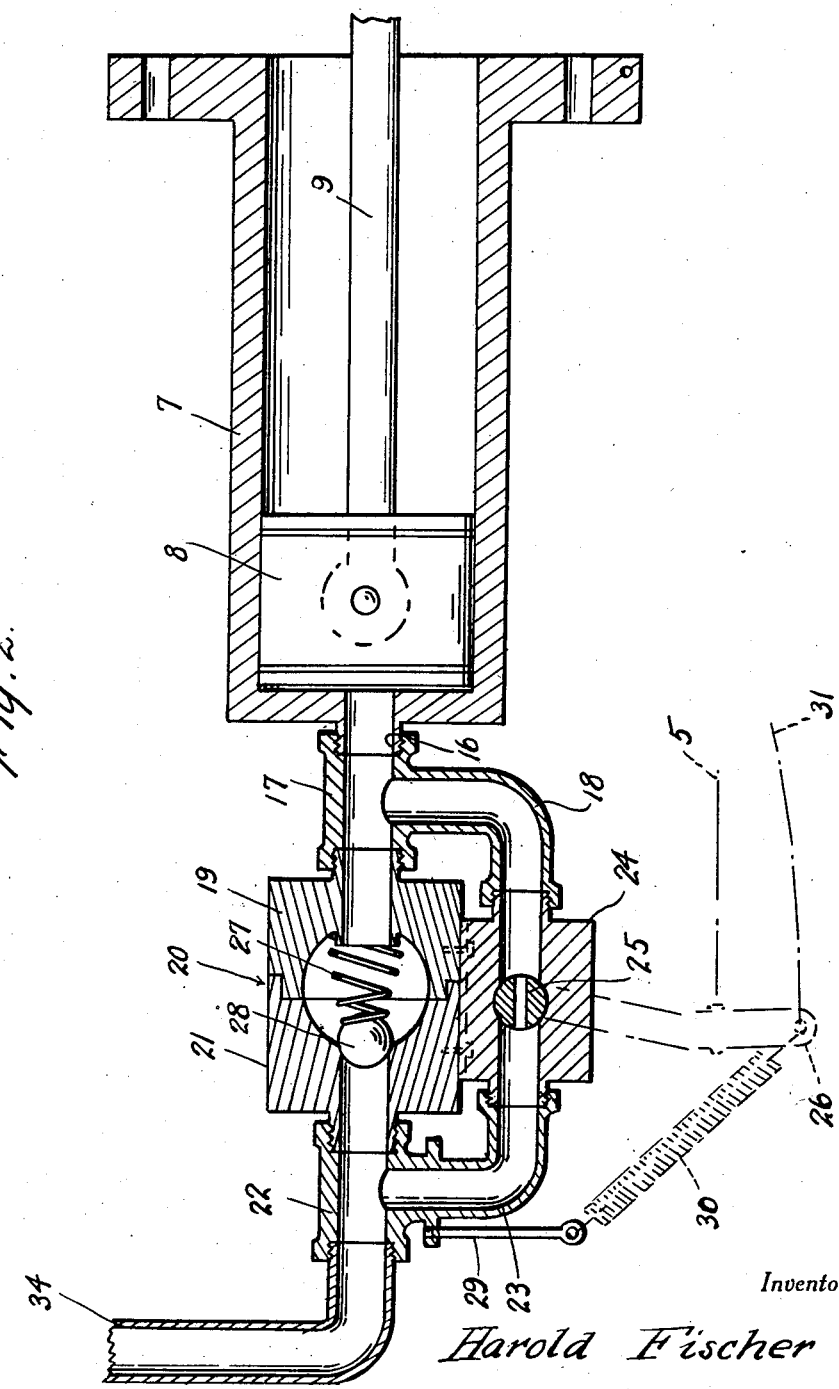

1,965,459

UNITED STATES PATENT OFFICE 1,965,459

BRAKE PEDAL RETAINING DEVICE

Harold Fischer, Hillside, N. J.

Application February 7, 1930, Serial No. 426,615

11 Claims. (Cl. 192—13)

My invention relates generally to automotive vehicle brake systems and particularly to means for retaining the brakes of such systems set in partly or fully applied condition.

An important object of my invention is to provide inexpensive means of the character referred to which can be easily added to an existing brake system whether of the mechanical or of the hydraulic type.

It is also an important object of my invention to provide controls for said means operable by the vehicle clutch pedal and/or by an independent instrument board mounted handle enabling quickly releasing the brakes from applied condition or quickly setting the brakes in applied condition after they have been applied, and holding them set until it is desired to release them.

Other objects and advantages of my invention will be apparent from a reading of the following description in connection with the drawings wherein for purposes of illustration I have shown preferred embodiments of my invention.

In the drawings:—

Figure 1 is a side elevational view of an embodiment of the invention in a mechanical brake system.

Figure 2 is an enlarged longitudinal vertical sectional view through Figure 1 showing the parts in their initial positions.

Figure 3 is a vertical longitudinal sectional view through another embodiment of my invention in a fluid or hydraulic brake system, showing the parts in their initial positions.

Figure 4 is a diagrammatic view of the hydraulic embodiment shown in Figure 3 showing the parts in their initial positions.

Referring in detail to the drawings, wherein like numerals refer to like parts throughout the same, the numeral 3 refers generally to an automobile instrument panel on which is mounted a push-pull handle 4 for operating a control cable 5. The dash board 6 has mounted on its forward side the retainer cylinder 7 which is open at its rearward end to communicate with a registered opening in the dash board. Within the cylinder 7 works a piston 8 which has the normal or initial position shown in Figure 2 and is reciprocated within the cylinder 7 by virtue of the pivotal connection thereto of the forward end of the connecting rod 9 which passes rearwardly through the opening in the dashboard and has its rearward end connected by a pin and slot connection 10 to the lower end of the lower arm 11 of the brake pedal 12. It will be obvious that when the brake pedal is depressed the effect will be to draw the piston 8 rearwardly and in so doing create suction in the front end of the cylinder 7 which draws fluid from the supply pipe 34 into the front part of the cylinder.

Alongside of the brake pedal in the unusual arrangement of these members is the clutch pedal composed of upper arm 13 and lower arm 14. If desired a clutch pedal return spring 15 as a substitute for or in aid of the usual clutch pedal return spring may be arranged as shown in the drawings with its forward end anchored to cylinder 7 and its rearward end connected to the lower end of the lower arm 14. A cable 31 having the same office and effect upon the mechanism to be described as the cable 5, has one end connected also to the lower end of the lower arm of the clutch pedal, so that when the clutch pedal is depressed it will pull the cable 31.

The only difference between the mechanical and the hydraulic embodiments of my invention with respect to the structure described above is in the manner of connecting the connecting rod 9 to the brake pedal and in the initial position of the piston 8 in the cylinder 7. In the mechanical embodiment the arrangement of these parts is exactly as described above, while in the hydraulic embodiment the initial position of the piston is near the rearward end of the cylinder, and the connecting rod is connected to the brake pedal above the pivotal point, that is, to the upper arm of the brake pedal rather than to the lower arm of the brake pedal. It is obvious that when the brake pedal in the hydraulic embodiment is depressed the piston is moved forwardly in the cylinder to produce compression instead of suction in the front end of the cylinder, and expel fluid rather than draw in fluid.

Reference being made to the mechanical embodiment shown in Figures 1 and 2, the numeral 16 refers to a threaded nipple on the front end of the cylinder 7 on which is threaded one arm of a T-coupling 17 the lower part of whose standard portion is right-angularly forwardly directed as indicated at 18. A sectional block 20 has a longitudinal bore each end of which leads into a threaded nipple. The rearward one of these nipples is threaded into the remaining arm of the T-coupling 17. The forward one of these nipples is threaded into one of the arms of a second and similar T-coupling 22, the remaining arms of this second T-coupling being threaded on a fluid supply pipe 34 having connection with a fluid reservoir 33 suitably mounted as shown in Figure 1. The lower part of the standard portion 23 of the second T-coupling is turned rearwardly. A plug valve body 24 has a longitudinal bore and a threaded nipple at each end of the bore which are screwed into the forwardly and rearwardly directed lower portions of the first and second T-couplings, respectively. A rotary plug valve 25 is operable across the bore and is maintained in the normal initial open position by a helical spring 30 stretched between the lower end of the plug valve operating arm 26 and a bracket 29 anchored to said second T-coupling. It is to the lower end of this rotary plug valve operating arm that the handle operated cable 5 and clutch pedal operated cable 31 are connected.

Intermediate the ends of the longitudinal bore of the sectional block 20 which is composed of the sections 19 and 21, is an enlarged chamber in which is located a spiral or helical spring 27 acting forwardly against a ball check 28 to initially and normally close the forward passage of the block against the intrusion of fluid from the supply pipe 34 until suction sufficient to overcome the tension of the spring 27 is produced by the piston in its rearward operative movement. During such operative movement of the piston fluid from the pipe is drawn into the front end of the cylinder and also through the by-pass constituted by the plug valve body and the T-couplings, since the plug valve 25 is normally open and is not operated closed until it is desired to set the brakes in applied condition by entrapping the fluid in the front end of the cylinder to prevent return forward movement of the piston. Closing of the rotary valve 25 while the brake pedal is depressed causes it to remain so until either of the plug valve operating cables 5, 31 is operated to open the plug valve 25 and release the fluid entrapped in the front end of the cylinder 7. The operation of cable 5 is accomplished by pulling out handle 4, while the operation of cable 31 is accomplished by depressing the clutch pedal. The handle 4 and cable 5 are used to set the brakes for long time parking as the handle 4 is capable of being given a permanent position and of being positively locked. The clutch pedal lacks any arrangement for holding the cable 31 in operated conditions after the operator's foot has been withdrawn from the clutch pedal, but provides means to hold the car temporarily on a steep grade without requiring continuous heavy pressure on the brake pedal which would otherwise be necessary. If the handle 4 be provided with a keylock, the clutch pedal cable is not used as its presence would defeat the utility of the lock for the handle by providing unlocked means to operate valve 25 independently of the handle.

In the hydraulic embodiment of the invention all of the above described structure is employed except that instead of the connection to the fluid reservoir 33, a connection to the fluid brake system is made through the medium of the pipe 34', and that the ball check 28' and the spring 27' have the function of normally closing the rearward passage through the block 20 instead of the forward passage thereof. The plug valve 25' is normally and initially open in this embodiment as it is in the mechanical embodiment heretofore described, but the initial position of the piston 8 is at the rearward end rather than at the forward end of the cylinder 7'.

In the hydraulic embodiment, when the brake pedal is depressed in applying the brakes and by reason of this the piston 8' moves forwardly in the piston 7, such fluid as may be in the front end of the piston is compressed by the piston and forced from the cylinder under pressure to the brakes. When the brakes have in this manner been applied the desired amount, the plug valve 25' is closed by manipulating either one of the cables 5' 31'. This holds the compressed fluid in the system and prevents any fluid from going back into the cylinder when the brake pedal is released, thereby holding the brakes set, until released by opening of the plug valve 25'.

It will be obvious that if the brakes be only lightly applied and are then set by closing valve 25, that stronger application of the brakes may be made without disturbing the set condition of the brakes except to increase the braking action thereof. This is true of both the mechanical and hydraulic forms of my invention.

Although I have shown and described herein preferred embodiments of my invention, it is to be definitely understood that I do not desire to limit the application of my invention thereto, but any change or changes may be made within the spirit of the invention and the scope of the subjoined claims.

Having thus described my invention, what I claim as new is:

1. A manual instrument panel and clutch control mechanism for the brakes of a motor vehicle, as described comprising a dash-board mounted cylinder having one end open, a piston in the cylinder having a piston rod extending through the open end of the cylinder and movably connected to the brake pedal of the vehicle, a fluid conveying line connected to the closed end of the cylinder, a control valve mechanism interpolated in the line between one end thereof and the closed end of the cylinder, said valve mechanism comprising an automatic normally closed valve, a lever controlled valve equipped by-pass connected around said automatic valve, a spring on the lever for returning the by-pass valve to normal position, a flexible link between the lever of the by pass valve and the clutch pedal, and a lockable operating handle mounted on the instrument panel of the vehicle having a cable for controllably operating the by-pass valve independently of movement of the clutch pedal.

2. The combination with an automobile having a clutch, clutch operating means, and a fluid brake system, of fluid compressing means, check valve means between the compressing means and the brake system, valved by-pass means connected around the check valve means, said clutch operating means being operatively connected to the valve by-pass means, and manual means for controlling the valved by-pass means independently of the clutch operating means.

3. A manual and clutch operated controlling device for automobile brakes comprising brake applying means, fluid pressure brake operating means actuable by the brake applying means, check valve means permitting egress of fluid from the fluid pressure brake operating means while preventing return of the fluid thereto once it has been expelled therefrom under pressure, normally open valve equipped by-pass means connected around the check valve means, clutch operating means, and connection means between the clutch operating means and the valve for closing said valve as the clutch is disengaged, and manual means for closing said valve and maintaining it closed independently of the action of clutch operating means.

4. The combination with an automobile having a clutch and operating means therefor and a fluid brake system having a fluid pressure creating means, of retaining means for retaining the fluid pressure creating means in operated condition and the brake system in applied condition, said retaining means comprising check valve means for preventing ingress of fluid into said pressure creating means while permitting egress of fluid under pressure therefrom, normally open valve equipped by-pass means connected around the check valve means which is adapted to be closed for retaining fluid pressure in the brake system and permit releasing of the pressure creating means from the operated condition, said clutch operating means being connected to the valve for closing it as the clutch is disengaged by the clutch operating means, and manual means for controlling the valve of the by-pass means independently of the action of the clutch operating means.

5. The combination with an automobile having a clutch, clutch operating means, a fluid brake system and pressure creating means for the brake system, of retaining means for retaining the pressure creating means in brake applying condition, said retaining means comprising check valve means for preventing ingress of fluid into said pressure creating means while permitting egress of fluid under pressure therefrom, normally open valve equipped by-pass means connected around the check valve means and adapted to be closed for retaining the brakes in applied condition by retaining fluid under pressure in the brake system while permitting the pressure creating means to be released from brake applying condition, connection means between the valve and the clutch operating means for closing the valve simultaneously with disengaging movement of the clutch operating means, and manual means for controlling the valve of the by-pass means independently of the clutch operating means, said manual means being adapted to close the valve and prevent its being opened by operation of the clutch operating means.

6. The combination with an automobile having disengageable transmission means, disengaging means therefor, and mechanical brakes together with brake applying means, of fluid pressure means for retaining the brakes in applied condition, said fluid pressure means comprising a fluid reservoir, fluid entrapping means operatively connected to the brake applying means, normally open valve-equipped fluid passage means between the reservoir and the fluid entrapping means for permitting transfer of fluid from the reservoir to the fluid entrapping means as the brakes are applied, and valve closing control connection means operatively connected between the valve and the disengageable transmission means whereby upon subsequent substantially simultaneous application of the brake applying means and disengagement of the transmission means fluid will be transferred to the fluid entrapping means and detained therein by the closing of the valve so as to prevent the brake applying means from returning to unapplied condition, and manual valve control means for controlling the valve independently of the transmission means, whereby the valve may be maintained closed and the brake applying means retained in applied condition even if the transmission means be permitted to return to engaged condition, and check valve means shunting said fluid passage whereby successive applications of the brake applying means may be made so as to draw additional fluid into the fluid entrapping means from the reservoir for augmenting braking action while the valve equipped passage is closed.

7. In a structure of the class described, a retainer for a brake pedal comprising a cylinder, a fluid container, a fluid line affording communication between said container and said cylinder, an automatic valve in said line, a piston reciprocable in the cylinder and operatively connected to the brake pedal, a by-pass around said automatic valve, a second valve in the by-pass and arranged to permit flow of fluid between said container and said cylinder, clutch pedal operated means for operating said second valve, and manual means for operating said second valve independently of said clutch pedal operated means.

8. In a structure of the class described, a fluid cylinder, a piston reciprocable in the cylinder, an operating rod connected between said piston and a brake pedal, a fluid conduit connected with said cylinder and including a normally closed spring-pressed ball check valve, a by-pass connected around said check valve, a manually regulated valve in said by-pass, a cable extending from an operating lever on said by-pass valve which is connected to an instrument board mounted lockable handle, and a flexible link between the clutch pedal and said operating lever for operating the by-pass valve independently of the handle.

9. A brake setting and retaining device for use with the hydraulic brake system of an automobile including brake applying means, a clutch and a clutch pedal, said device comprising fluid pressure means for operating the brakes, said fluid pressure means being actuated by said brake applying means, automatic valve means for controlling passage of fluid between said fluid pressure means and the system, valved by-pass means connected around said automatic valve means, said valved by-pass means being selectively operable independently of said automatic valve means for releasing or retaining fluid under pressure in said system for releasing or retaining the brakes in applied condition, clutch pedal operated means for controlling said valved by-pass means, and manual means for controlling said by-pass means independently of said clutch pedal operated means.

10. The combination with an automobile having a clutch, clutch operating means, and a fluid brake system including pressure producing means; of retaining means for retaining said pressure producing means in brake applying condition, said retaining means comprising check valve means interpolated between said pressure producing means and the system for preventing movement of fluid to said pressure producing means from said system while permitting movement of fluid in the opposite direction whenever said fluid pressure producing means is operated, a by-pass connected around said check valve means including a normally open valve adapted to be closed to retain fluid under pressure in said system for keeping the brakes applied, while releasing the pressure producing means to permit it to return to initial condition, connection means between the said normally open valve and the clutch operating means to close said normally open valve when said clutch operating means is operated for disengaging the clutch, and manual means for controlling said by-pass means independently of said clutch pedal operating means.

11. The combination with an automobile having disengageable transmission means, means for disengaging the same, and a mechanical brake system including an applying member; of fluid pressure means operable by said applying member, said fluid pressure means including fluid moving means, a reservoir supplying the fluid moving means with fluid, check valve means interpolated between the reservoir and fluid moving means to prevent return of fluid from the fluid moving means to said reservoir while permitting movement of fluid from the reservoir to said fluid moving means, fluid passage means connected around said check valve means to provide for movement of fluid to and fro between said reservoir and said fluid moving means, normally open valve means in said fluid passage means and operatively connected to said disengaging means so as to be closed whenever the disengaging means is operated to disengage the transmission, thereby preventing movement of fluid from said fluid moving means so as to retain the applying member in applied condition, and manual means connected to said normally open valve means for closing the same independently of the condition of said disengaging means, thereby enabling retaining the brake system applying member in the applied condition after the disengaging member has been permitted to return to engaged condition.

HAROLD FISCHER.